(12) United States Patent
Barsotti et al.

(10) Patent No.: US 6,998,154 B2
(45) Date of Patent: Feb. 14, 2006

(54) TWO COMPONENT COATING COMPOSITIONS CONTAINING HIGHLY BRANCHED COPOLYESTER POLYOL

(75) Inventors: Robert John Barsotti, Franklinville, NJ (US); Carl Brent Douglas, Boothwyn, PA (US); Laura A. Lewin, Greenville, DE (US); Isao Nagata, Troy, MI (US); Lech Wilczek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 79 days.

(21) Appl. No.: 10/370,338

(22) Filed: Feb. 19, 2003

(65) Prior Publication Data

US 2004/0043152 A1    Mar. 4, 2004

Related U.S. Application Data

(60) Provisional application No. 60/359,066, filed on Feb. 20, 2002.

(51) Int. Cl.
*B05D 3/02* (2006.01)
*C08G 63/08* (2006.01)

(52) U.S. Cl. .............. 427/379; 428/480; 525/450; 525/453; 528/80; 528/81; 528/354; 528/361

(58) Field of Classification Search ............ 525/450, 525/453; 528/51, 58, 85, 40, 41, 354, 361
See application file for complete search history.

(56) References Cited

U.S. PATENT DOCUMENTS

| | | | |
|---|---|---|---|
| 3,169,945 A | 2/1965 | Hostettler et al. | |
| 3,585,160 A | 6/1971 | Miller et al. | |
| 4,098,743 A * | 7/1978 | Scriven et al. | 524/590 |
| 4,242,243 A | 12/1980 | Antonelli et al. | |
| 4,692,481 A | 9/1987 | Kelly | |
| 4,719,132 A | 1/1988 | Porter, Jr. | |
| 4,849,480 A | 7/1989 | Antonelli et al. | |
| 5,010,140 A | 4/1991 | Antonelli et al. | |
| 5,279,862 A | 1/1994 | Corcoran et al. | |
| 5,418,301 A | 5/1995 | Hult et al. | |
| 5,663,247 A | 9/1997 | Sorensen et al. | |
| 5,763,528 A | 6/1998 | Barsotti et al. | |
| 5,990,260 A | 11/1999 | Pettersson | |
| 6,093,777 A | 7/2000 | Sorensen et al. | |
| 6,114,458 A | 9/2000 | Hawker et al. | |
| 6,114,489 A | 9/2000 | Vicari et al. | |
| 6,130,286 A * | 10/2000 | Thomas et al. | 524/507 |
| 6,211,329 B1 | 4/2001 | Rehnberg et al. | |
| 6,221,494 B1 | 4/2001 | Barsotti et al. | |
| 6,284,233 B1 | 9/2001 | Simon et al. | |
| 6,458,885 B1 * | 10/2002 | Stengel et al. | 524/507 |

FOREIGN PATENT DOCUMENTS

| | | |
|---|---|---|
| EP | 0 319 927 A2 | 6/1989 |
| WO | WO 00/55263 A1 | 9/2000 |
| WO | WO 00/68331 A1 | 11/2000 |
| WO | WO 01/46296 A1 | 6/2001 |
| WO | WO 03/070844 A1 | 8/2003 |

OTHER PUBLICATIONS

Abstract for JP 61-168614.*
Tomalia et al., Starburst Dendrimers: Molecular-Level Control of Size, Shape, Surface Chemistry, Topology, and Flexibility from Atoms to Macroscopie Matter, Angew. Chem. Int. Ed. Engl., 1990, vol. 29, pp. 138-175.
Copy of the International Search Report, International Application No. PCT/US 03/04883.

* cited by examiner

*Primary Examiner*—Marc S Zimmer
(74) *Attorney, Agent, or Firm*—Sudhir G. Deshmukh

(57) ABSTRACT

This invention relates to rapid curing coating compositions that are particularly useful for automotive OEM and refinish applications. The coating composition includes a binder component that contains a novel highly branched copolyester polyol, and a crosslinking component that contains conventional crosslinking agents, such as polyisocyanate and melamine. This invention is also directed to a process for producing coatings from the rapid curing coating compositions. These compositions are especially useful in providing for mar resistant and flexible coatings.

36 Claims, No Drawings

TWO COMPONENT COATING COMPOSITIONS CONTAINING HIGHLY BRANCHED COPOLYESTER POLYOL

CROSS REFERENCE TO RELATED APPLICATION

This application claim benefit of U.S. provisional Ser. No. 60/359,066 filed on Feb. 20, 2002.

BACKGROUND OF THE INVENTION

1. Field of the Invention

This invention relates to rapid curing coating compositions that are particularly useful for automotive OEM (Original Equipment Manufacture) applications and for automotive refinish applications.

2. Description of the Prior Art

The typical finish on an automobile or truck body comprises an electrodeposited primer layer, an optional primer or primer surfacer layer over the electrodeposited layer and then a pigmented base coat layer and over the pigmented base coat layer, a clear coat layer is applied. A pigmented mono-coat may be used in place of the base coat/clear coat. A number of clear and pigmented coating compositions have been utilized as automotive OEM and automotive refinish coatings, such as, primers, basecoats and clear coats but none meet the rapid curing times that are desired in combination with outstanding physical properties, such as, mar resistance and good flexibility. Such coating compositions can, if desired, have low volatile organic content (VOC).

In refinishing automobiles and trucks, the damaged painted areas having dents, mars and scratches and the like are sanded or ground out by mechanical means in and around the damaged area. Sometimes the original coating is stripped off from a portion or off the entire auto or truck body to expose the substrate (e.g., bare metal) underneath. After repairing the damage, the repaired surface is coated and applied layers are dried and cured.

A key concern of the automobile and truck refinish industry is productivity, i.e., the ability to complete an entire refinish operation in the least amount of time. To accomplish a high level of productivity, any coatings applied need to have the combination of "snap dry" and "through dry" at ambient temperature conditions in a relatively short period of time. The term "snap dry" means that the resulting finish is physically dry to the touch in a relatively short period of time to minimize dirt pick-up and minimize contamination from other sources when the automobile or truck is removed from the spray booth or spray area. The term "through dry" means that the finish is sufficiently cured to allow buffing of the finish.

In automotive OEM, rapid dry and curing of a coating that forms a finish with excellent properties, such as, improved mar resistance and excellent flexibility is very desirable since it is possible to reduce baking temperatures and baking times thereby decreasing productions costs.

Current commercially available coating compositions do not have these unique characteristics of rapidly curing under ambient temperature conditions along with the ability to form a finish having improved mar resistance and flexibility. It would be advantageous to have a coating composition with this unique combination of properties.

STATEMENT OF THE INVENTION

This invention is directed to a coating composition comprising:

(a) a binder component, which comprises a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20; and (b) a crosslinking component selected from the group consisting of a polyisocyanate having at least two reactive isocyanate groups, a melamine and a combination thereof.

This invention is further directed to a process for producing a coating on the surface of a substrate, said process comprising:

mixing binder and crosslinking components of a coating composition to form a potmix, wherein said binder component comprises a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20; and said crosslinking component selected from the group consisting of a polyisocyanate having at least two reactive isocyanate groups, a melamine and a combination thereof;

applying a layer of said pot mix on said surface; and curing said layer to form said coating on said surface of said substrate.

DETAILED DESCRIPTION OF THE INVENTION

As used herein:

"Two-pack coating composition" means a thermosetting composition comprising two components that are stored in separate containers, which are typically sealed for increasing the shelf life of the components of the coating composition. The components are mixed just prior to use to form a pot mix, which has a limited pot life, typically a few minutes, such as, 15 minutes to 45 minutes to a few hours, such as, 2 hours to 6 hours. The pot mix is applied as a layer of a desired thickness on a substrate surface, such as, an autobody. After application, the layer dries and cures to form a finish on the substrate surface having desired coating properties, such as mar resistance.

"Low VOC coating composition" means a coating composition that is less than about 0.6 kilogram of organic solvent per liter (5 pounds per gallon) of the composition, as determined under the procedure provided in ASTM D3960.

"High solids composition" means a coating composition having a solids content of above 30 percent, preferably in the range of from 40 to 100 percent, in weight percentages based on the total weight of the composition.

"Number average molecular weight" and "weight average molecular weight" are determined by gel permeation chromatography (GPC) using a high performance liquid chromatograph (HPLC) supplied by Hewlett-Packard, Palo Alto, Calif. Unless stated otherwise, the liquid phase used was tetrahydrofuran and the standard used was polymethyl methacrylate.

"Polydispersity" means weight average molecular weight divided by number average molecular weight.

"Polymer solids" or "Binder solids" means a polymer or binder in its dry state.

"Functionality" means the number average molecular weight (Mn) divided by the calculated functional group equivalent weight. The preferred functional group is a hydroxyl group. For example, the functionality of a highly branched copolyester polyol is the number average molecular weight (Mn) divided by the hydroxyl equivalent weight (HEW) or Mn/HEW.

"Free valency" means a bond site on a moiety (atom, group of atoms, functional group, radical, molecule, compound, oligomer or polymer) that is capable of forming a chemical bond to another atom, group of atoms, functional group, radical, molecule, compound, oligomer or polymer. For example, pentaerythritol provides a tetravalent pentyl radical having four free valencies connected to four hydroxyl groups. Trimethylolacetic acid provides a tetravalent butyl radical having four free valencies connected to three hydroxyl groups and one carboxyl group. Dimethylolpropionic acid provides trivalent butyl radical having three free valencies connected to two hydroxyl and one carboxyl group. Trimethylolpropane provides a trivalent hexyl radical having three free valencies connected to three hydroxyl groups. Caprolactone provides a divalent pentyl radical having two free valencies connected to a divalent internal ester group.

"(Meth)acrylate" means acrylate and methacrylate.

"Tg" (glass transition temperature) measured in ° C. determined by DSC (Differential Scanning Calorimetry).

The present invention is directed to a coating composition suited for various coating processes, such as automotive OEM and automotive refinish. The novel coating composition is particularly well suited for use in automotive refinishing used for repairing or refinishing coating auto and truck bodies. For OEM applications the coating composition can be a one-package composition wherein the highly branched copolyester polyol containing binder component and crosslinking component are blended together and applied. If the crosslinking component includes a melamine, it can be blended with the binder component. No crosslinking occurs until an applied layer of the composition is baked at an elevated temperature. If the crosslinking component includes a polyisocyanate, it is mixed with the binder component just before application or if the reactive isocyanate groups on the polyisocyanate are inactivated with a blocking agent that unblocks upon baking, the crosslinking component containing the blocked polyisocyanate can be blended with the binder component and the composition remains stable.

Generally, when the novel coating composition is used for refinish applications, a two-pack composition is provided in which the binder component containing the highly branched polyester polyol is included in one pack and the crosslinking component containing the polyisocyanate is included in the second pack and the two packs are mixed together just before application.

Highly Branched Copolyester Polyol

The novel coating composition of the present invention includes binder and crosslinking components. The binder component includes a highly branched copolyester polyol in the range of from 2 percent to 100 percent, preferably, in the range of from 3 percent to 50 percent, and most preferably in the range of from 5 percent to 40 percent; the percentages being in weight percentages based on the total weight of the binder component solids of the coating composition.

The highly branched copolyester polyol has a number average molecular weight not exceeding 30,000, preferably in the range of from 1,000 to 30,000, more preferably in the range of 1,200 to 20,000, most preferably in the range of 1,500 to 12,000. The copolyester polyol has hydroxyl groups ranging from 5 to 200 per polymer chain, preferably 5 to 70, and more preferably 6 to 50, and carboxyl groups ranging from 0 to 40 per chain, preferably 1 to 40, more preferably 1 to 20 and most preferably 1 to 10. The Tg (glass transition temperature) of the copolyester polyol ranges from −70° C. to 50° C., preferably from −65° C. to 40° C., and more preferably from −60° C. to 30° C.

The highly branched copolyester polyol is conventionally polymerized from a monomer mixture containing a chain extender selected from the group consisting of a hydroxy carboxylic acid, a lactone of a hydroxy carboxylic acid and a combination thereof; and one or more hyper branching monomers.

Some of the suitable hydroxy carboxylic acids include glycolic acid; lactic acid; 3-hydroxycarboxylic acids, e.g., 3-hydroxypropionic acid, 3-hydroxybutyric acid, 3-hydroxyvaleric acid, and hydroxypyvalic acid.

Some of the suitable lactones include caprolactone, valerolactone; and lactones of the corresponding hydroxy carboxylic acids, such as, glycolic acid; lactic acid; 3-hydroxycarboxylic acids, e.g., 3-hydroxypropionic acid, 3-hydroxybutyric acid, 3-hydroxyvaleric acid, and hydroxypyvalic acid. Caprolactone is preferred.

Suitable hyper branching monomers include those having one carboxyl group and two hydroxyl groups, two carboxyl groups and one hydroxyl group, one carboxyl group and three hydroxyl groups, or three carboxyl groups and one hydroxyl group. The foregoing monomers can be structurally represented by the following structures wherein A is carboxyl and B is hydroxyl:

(1)

-continued

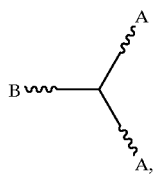
(2)

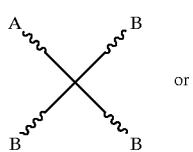
or
(3)

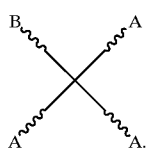
(4)

It should be noted that even though that A and B groups in foregoing structures are shown in terminal position, it is contemplated these groups could be positioned anywhere in these structures. Some of the suitable hyper branching monomers include dialkylol propionic acid, preferably dimethylol propionic acid and diethylol propionic acid; trimethylolacetic acid; citric acid; malic acid; gluconic acid; and a combination thereof.

When the aforedescribed monomer mixture contains hyper branching monomer having two carboxyl groups and one hydroxyl group or three carboxyl groups and one hydroxyl group, the resulting highly branched copolyester polyol is further reacted with a monoepoxy, such as ethylene oxide, propylene oxide, epoxy butane, epoxycyclohexane, epoxydecane, and Glydexx® N-10, a mixed glycidyl ester from Exxon Chemicals, Houston, Tex.; a diol having one primary hydroxyl and one secondary or tertiary hydroxyl group, such as 2-ethyl, 1,3-hexane diol, 1,3-butane diol, 1,2-propane diol, or combination thereof; or a combination of the monoepoxy and diol to provide the highly branched copolyester polyol with the described range of hydroxyl groups. It should be understood that by controlling the amount of monoepoxy or diol used for post-reaction, some of the carboxyl groups on the resulting highly branched copolyester polyol can be left intact, thus providing the highly branched copolyester polyol with a desired range of carboxyl groups.

The weight ratio of the hyper branching monomer to the chain extender in the monomer mixture ranges from 1/0.3 to 1/20, preferably from 1/1 to 1/10 and more preferably from 1/1.5 to 1/4.

The monomer mixture can further include one or more molecular weight controlling agents having in the range of 1 to 6 functionalities selected from the group consisting of hydroxyl, amine, epoxide, carboxyl and a combination thereof. Some of the suitable molecular weight controlling agents can include polyhydric alcohols, such as ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol; polyalkylene glycol, such as, polyethylene glycol and polypropylene glycol. The preferred polyhydric alcohols are ditrimethylolpropane, trimethylolethane, trimethylolpropane and pentaerythritol. Monohydric alcohols can be also used, such as, cyclohexanol and 2-ethylhexanol.

Some of the suitable molecular weight controlling agents include epoxides such as, monoepoxides, e.g., ethylene oxide, propylene oxide, epoxy butanes, epoxycyclohexane, epoxydecane, and Glydexx® N-10, a mixed glycidyl ester from Exxon Chemicals, Houston, Tex. Polyepoxies also can be used, such as, glycidyl esters, for example, Araldite®CY-184 from Ciba Specialty Chemicals, Tarrytown, N.Y. Cycloaliphatic epoxides and sorbitol gylcidyl ethers can be also used. Others that can be used are glycidyl ethers of Bisphenol A, glycidyl methacrylate copolymers, epichlorohydrine-polyols and epoxidized polyunsaturated compounds, e.g., epoxidized natural oils and epoxidized polybutadienes.

Some of the suitable molecular weight controlling agents can include monoamines, such as butyl amine, hexyl amine, and cyclohexyl amine; polyamines, such as ethylene diamine, hexamethylene diamine, diethylene triamine, and PACM diamine supplied by Airproducts Inc., Allentown, Pa., or combinations thereof.

Some of the suitable molecular weight controlling agents can include carboxylic acids, such as acetic, hexanoic, adipic, azelaic acids or combinations thereof. The carboxylic acids can have, for example, two carboxyl groups and two hydroxyl groups, such as tartaric acid.

Two preferred highly branched copolyester polyols are (1) the reaction product of dimethylol propionic acid and caprolactone, and (2 the reaction product of dimethylol propionic acid, caprolactone and pentaerythritol. These polyols produce coating compositions that form coatings having excellent mar resistance, excellent flexibility and rapid cure.

The monomer mixture preferably includes dialkylol propionic acid, such as dimethylol propionic acid and caprolactone. The more preferred monomer mixture further includes pentaerythritol, trimethylol propane or more preferably pentaerythritol. A coating composition containing the resulting highly branched copolyester polyol forms coatings that have excellent mar resistance, excellent flexibility and rapid cure.

The highly branched copolyester polyol can be produced by polymerizing, in one step, the monomer mixture that includes the chain extender and the highly branched monomers. If desired, the monomer mixture in the foregoing one step random polymerization process can also include the molecular weight controlling agent. One example of the resulting highly branched copolyester polyol produced by the one step process has the following structure:

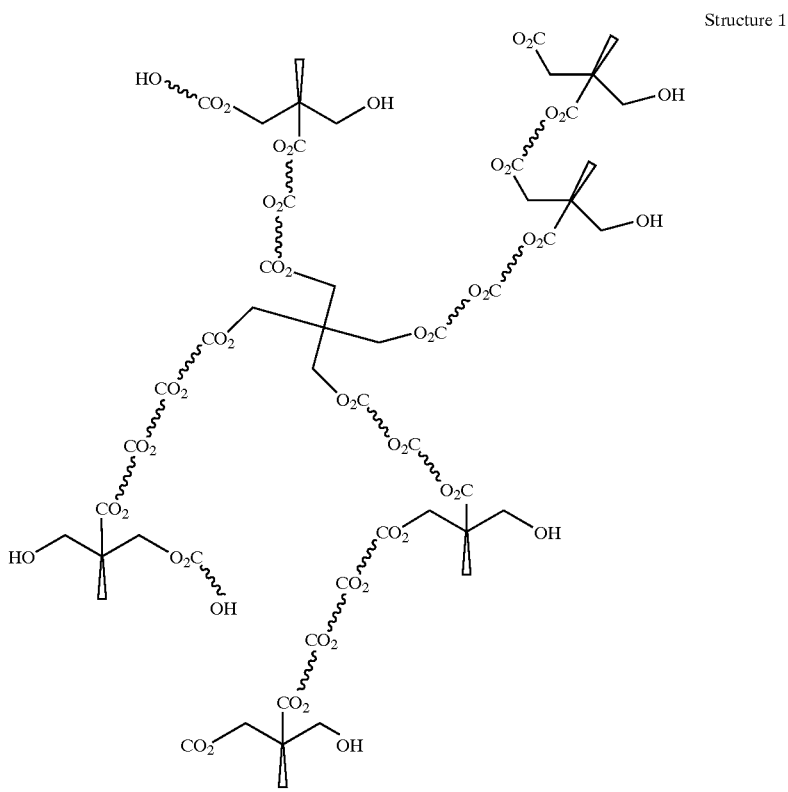

Structure 1 wherein the monomer mixture used to produce the highly branched copolyester polyol of Structure 1 includes, caprolactone as a chain extender, dimethylol propionic acid as a hyper branching monomer and pentaerythritol as a molecular weight controlling agent.

Alternatively, the highly branched copolyester polyol can be produced in stages by first polymerizing the highly branched monomers followed by polymerizing the chain extender. Thus, in the first step, the monomer mixture, which includes the highly branched monomers, is polymerized and then in the second step, the polymerization is continued with the addition of the chain extender.

In another alternative, the highly branched copolyester polyol is produced in stages by first polymerizing the molecular weight controlling agent and the highly branched monomers followed by polymerizing the chain extender. Thus, in the first step, the monomer mixture, which includes the highly branched monomers and the molecular weight controlling agent, is polymerized and then in the second step, the polymerization is continued with the addition of the chain extender. One example of the resulting highly branched copolyester polyol produced by such a two step process has the following structure:

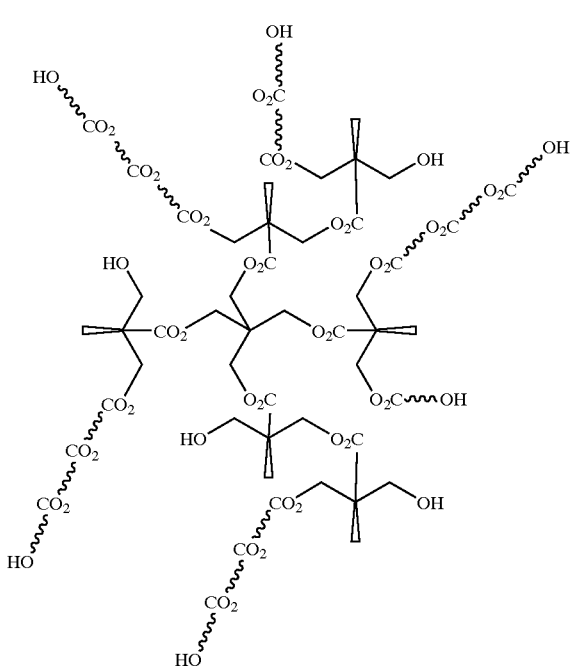

Structure 2 wherein the monomer mixture used to produce the highly branched copolyester polyol of Structure 2 includes caprolactone as a chain extender, dimethylol propionic acid as a hyper branching monomer and pentaerythritol as a molecular weight controlling agent.

Still another modification of the foregoing process includes producing the highly branched copolyester polyol in stages by first polymerizing the molecular weight controlling agent and the highly branched monomers and a portion of chain extender followed by polymerizing the remainder of the chain extender. Typically, the monomer mixture contains 10 to 90, preferably 20 to 60 and more preferably 30 to 40 weight percentage of the chain extender in the first stage, the remainder of the chain extender being added during the second stage.

One example of the resulting highly branched copolyester polyol produced by such a two step process has the following structure:

Structure 3

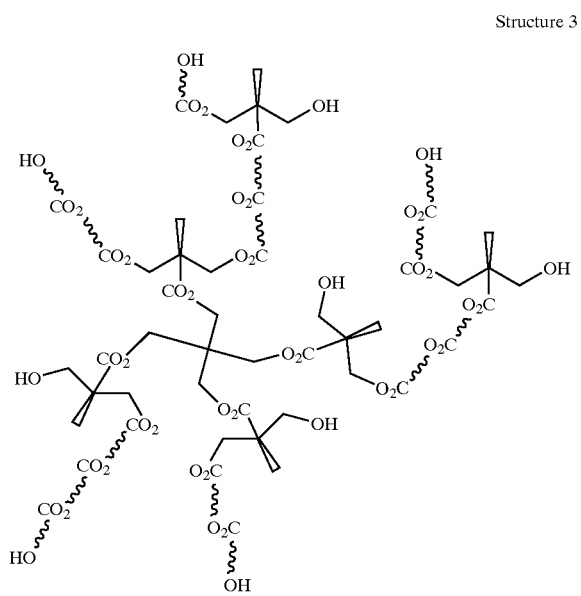

wherein the monomer mixture used to produce the highly branched copolyester polyol of Structure 3 includes caprolactone as a chain extender, dimethylol propionic acid as a hyper branching monomer and pentaerythritol as a molecular weight controlling agent.

The foregoing two step can be modified by first polymerizing the highly branched monomers and a portion of chain extender followed by polymerizing the remainder of the chain extender. Typically, the monomer mixture contains 10 to 90, preferably 20 to 60 and more preferably 30 to 40 weight percentage of the chain extender in the first stage, the remainder of the chain extender being added during the second stage.

In still another alternative, the highly branched copolyester polyol is produced in stages by first polymerizing the molecular weight controlling agent and a portion of the highly branched monomers and a portion of chain extender followed by polymerizing the remainder of the highly branched monomers and chain extender. Thus, in the first step, the monomer mixture, which includes a portion of the highly branched monomers, a portion of chain extender and the molecular weight controlling agent, is polymerized and then in the second step, the polymerization is continued with the addition of the remaining portions of the highly branched monomers and chain extender. Typically, the monomer mixture contains 10 to 90, preferably 20 to 60 and more preferably 30 to 40 weight percentage of the chain extender, and 10 to 90, preferably 20 to 80 and more preferably 40 to 60 weight percentage of the highly branched monomers in the first stage, the remainder of the chain extender and the highly branched monomers being added during the second stage.

In still another alternative, the highly branched copolyester polyol is produced in stages by first polymerizing portions of the molecular weight controlling agent, highly branched monomers and chain extender followed by polymerizing the remainder of said molecular weight controlling agent, highly branched monomers and chain extender. Thus, in the first step, the monomer mixture, which includes portions of the highly branched monomers, chain extender and the molecular weight controlling agent, is polymerized and then in the second step, the polymerization is continued with the addition of the remaining portions of the highly branched monomers, chain extender and the molecular weight controlling agent. Typically, the monomer mixture contains 10 to 90, preferably 20 to 60 and more preferably 30 to 40 weight percentage of the chain extender; contains 10 to 90, preferably 20 to 80 and more preferably 40 to 60 weight percentage of the molecular weight controlling agent; and 10 to 90, preferably 20 to 80 and more preferably 40 to 60 weight percentage of the highly branched monomers in the first stage, the remainder of the chain extender and the highly branched monomers being added during the second stage.

Another structure of the highly branched copolyester polyol produced from a monomer mixture containing a hyper branching monomer of the formula:

wherein A is carboxyl and B is hydroxyl as shown in Structure 4 below:

Structure 4

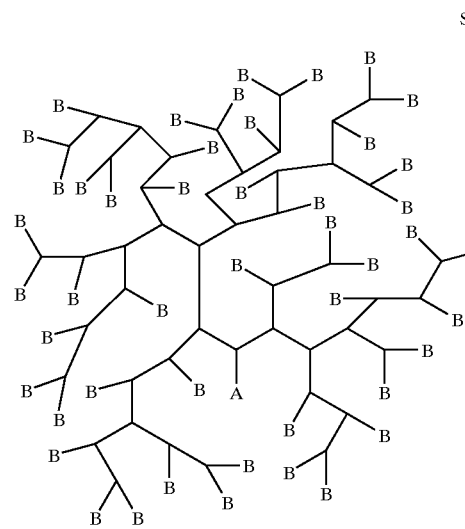

A preferred highly branched copolyester polyol is polymerized from a monomer mixture that includes:

one or more hyper branching monomers having the structural formula:

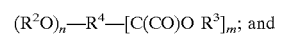

a chain extender selected from the group consisting of a hydroxy carboxylic acid, an ester of a hydroxy carboxylic acid and a combination thereof, said hydroxy carboxylic acid having the structural formula:

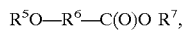
$R^5O-R^6-C(O)O\ R^7$, wherein:
$R^2$ and $R^5$ are H or (O)C $R^8$,
$R^3$ and $R^7$ are H, $C_{1-12}$ hydrocarbyl radical or hydroxyl substituted $C_{1-12}$ hydrocarbyl radical,
$R^4$ is $C_{1-12}$ hydrocarbyl radical having m+n free valencies,
$R^6$ is $C_{1-12}$ hydrocarbyl radical with two free valencies,
$R^8$ is H or $C_{1-200}$ hydrocarbyl radical and
n+m ranges from 3 to 6, and provided n or m is 1.

The aforedescribed monomer mixture preferably further includes a molecular weight controlling agent having the formula:

$R^1-Z_k$, wherein:
$R^1$ is $C_{1-200}$ hydrocarbyl radical with free valencies ranging from 1 to 6,
Z is a hydroxyl, carboxyl, amine or epoxy group, and
k ranges from 1 to 6.

The highly branched copolyester polyol by the aforedescribed processes can be prepared by a batch process or by a continuous polymerization process.

Generally, the aforedescribed processes for forming the copolyester polyol take place at reaction temperatures in the range of from 60° C. to 200° C. and preferably, in the range of from 80° C. to 170° C.; with typical reaction times ranging from 1 hour to 24 hours, preferably 1 hour to 4 hours. The polymerization can be catalyzed by conventional polyester catalysts, such as tin (II) di(2-ethylhexanoate)(Sn $(O_2\ CC_7H_{15})_2$).

Crosslinking Component

The coating composition of the present invention includes a crosslinking component selected from the group consisting of a polyisocyanate having at least two reactive isocyanate groups, a melamine and a combination thereof.

The suitable polyisocyanate has at least 2 and on an average 2 to 6, preferably, 2.5 to 6 and more preferably, 3 to 4 isocyanate functionalities. Typically the coating composition has a ratio of isocyanate groups on the polyisocyanate in the crosslinking component to hydroxyl groups of the highly branched copolyester polyol ranges from 0.25/1 to 3/1, preferably 0.8/1 to 2/1, most preferably 1/1 to 1.8/1.

Examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Additional examples of suitable polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega -dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate, 3,3'-dimethyldicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

If desired, the isocyanate functionalities of the polyisocyanate may be capped with a monomeric alcohol to prevent premature crosslinking in a one-pack coating composition. Some suitable monomeric alcohols include methanol, ethanol, propanol, butanol, isopropanol, isobutanol, hexanol, 2-ethylhexanol and cyclohexanol.

Clear coat compositions or pigmented mono-coat or basecoat compositions can be formulated with the highly branched copolyester polyol and a polyisocyanate as a crosslinking component. These compositions have excellent properties, such as, mar resistance, good gloss, DOI (Distinctness of Image) and rapid cure.

The coating composition wherein when the crosslinking component includes melamine, the composition contains in the range of 10 percent to 40 percent, preferably 20 percent to 40 percent, and most preferably 25 percent to 35 percent, all percentage being weight percentages based on the total weight of the binder and crosslinking components solids.

Melamine formaldehyde resins, commonly referred to as melamines, include monomeric or polymeric melamines or a combination thereof. Alkoxy monomeric melamines are preferred.

In the context of the present invention, the term "alkoxy monomeric melamine" means a low molecular weight melamine which contains, on an average three or more methylol groups etherized with a $C_{1\ to\ 5}$ monohydric alcohol, such as, methanol, n-butanol, or isobutanol per triazine nucleus, and has an average degree of condensation up to about 2 and preferably in the range of about 1.1 to about 1.8, and has a proportion of mononuclear species not less than about 50 percent by weight. The polymeric melamines have an average degree of condensation of more than 1.9

Some of such suitable monomeric melamines include highly alkylated melamines, such as, methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel® 1158 provided by Cytec Industries Inc., West Patterson, N.J.

Cytec Industries Inc. also supplies Cymel® 1130 @ 80 percent solids (degree of polymerization of 2.5), Cymel® 1133 (48% methyl, 4% methylol and 48% butyl), both of which are polymeric melamines.

Melamines can be used along with polyisocyanates. Applicants have unexpectedly discovered that by substantially increasing the total amount of polyisocyanate and melamine in a crosslinking component of a coating composition, provided neither component is more than about half of the total composition solids, results in a low VOC coating composition having improved mar and etch resistance coupled with low application viscosity so long as the copolyester polyol is also included. Low molecular weight highly branched copolyester polyols are preferred to obtain even a lower coating application viscosity. Moreover, the foregoing combination also does not adversely affect other important coating properties, such as, gloss, DOI and other desired coating properties.

A clear or pigmented coating composition of the present invention can be formulated that includes the highly branched copolyester polyol, a polyisocyanate and a melamine component wherein the total amount of the polyisocyanate and melamine components ranges from 50 percent to 90 percent, preferably 60 to 80 weight percent and more preferably 65 to 75 weight percent, all the percentages being in weight percentage based on the total weight of composition solids.

The coating composition preferably includes one or more catalysts to enhance crosslinking of the components on curing. Generally, the coating composition includes in the range of from 0.001 percent to 5 percent, preferably in the range of from 0.005 to 2 percent, more preferably in the range of from 0.01 percent to 2 percent and most preferably in the range of from 0.01 percent to 1.2 percent of the catalyst, the percentages being in weight percentages based on the total weight of the highly branched copolyester polyol and polyisocyanate and optionally, a melamine.

Some of the suitable catalysts for melamine can include one or more conventional acid catalysts, such as, aromatic sulfonic acids, for example, dodecylbenzene sulfonic acid, para-toluenesulfonic acid and dinonyinaphthalene sulfonic acid, all of which are either unblocked or blocked with an amine, such as, dimethyl oxazolidine and 2-amino-2-methyl-1-propanol, n,n-dimethylethanolamine or a combination of such amines. Other acid catalysts that can be used are strong acids, such as phosphoric acids, more particularly phenyl acid phosphate, which may be unblocked or blocked with an amine.

Some of the suitable catalysts for polyisocyanate can include one or more tin compounds, tertiary amines or a combination thereof; and one or more aforedescribed acid catalyst. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that can be used is Fastcat® 4202 dibutyl tin dilaurate sold by Elf-Autochem North America, Inc. Philadelphia, Pa.

Other Additives

The following additional ingredients can be included in the binder component of the coating composition in amounts of up to 98% by weight, preferably in the range of 60% to 95% by weight of the binder component solids of the composition.

Some of the additional ingredients can include a hydroxyl containing (meth)acrylic polymer, a polyester, an oligomer, a non-aqueous dispersed (NAD) polymer and a combination thereof.

Particularly useful hydroxyl containing (meth)acrylic polymers have a weight average molecular weight of 3,000 to 20,000 and a Tg from 0° C. to 100° C. and are the polymerization product of typical acrylic monomers, such as, alkyl (meth)acrylate monomers having 1 to 18 carbon atom in the alkyl group and hydroxy functional monomer, such as, hydroxy alkyl (meth)acrylates having 1 to 4 carbon atoms in the alkyl group. The hydroxyl containing (meth) acrylic polymers can be polymerized from a monomer mixture that includes an ethylenically polymerized silane, such as, trimethoxy propyl silyl methacrylate; or tertiarybutylaminoethyl methacrylate. Some of the other suitable acrylic polymers are also listed in U.S. Pat. No. 6,221,494 on column 5, which are incorporated herein by reference.

Typically useful polyesters have a weight average molecular weight ranging from 1500 to 20,000 and a Tg in the range of −50° C. to +100° C. Some of the other suitable polyesters are also listed in U.S. Pat. No. 6,221,494 on column 5 and 6, which is incorporated herein by reference. The suitable polyester is the esterification product of an aliphatic or aromatic dicarboxylic acid, a polyol, a diol, an aromatic or aliphatic cyclic anhydride and a cyclic alcohol. One preferred polyester is the esterification product of adipic acid, trimethylol propane, hexanediol, hexahydrophathalic anhydride and cyclohexane dimethylol.

Typically useful oligomers are provided on an average in the range of from 2 to 10, preferably in the range of from 2 to 6 and more preferably in the range of from 2 to 4 with hydroxyl groups. Of these hydroxyl groups, on an average at least one, preferably in the range of 1 to 4, more preferably in the range of from 2 to 4 must be primary hydroxyl groups. The foregoing average range may be attained by blending reactive oligomers having various number of primary hydroxyl groups. The primary hydroxyl group is a hydroxyl group positioned at the terminal end of the oligomer. A suitable oligomer is produced by first reacting a multifunctional alcohol, such as, pentaerythritol, hexandiol, trimethyol propane with alicyclic monomeric anhydrides, for example, hexahydrophthalic anhydride or methylhexahydrophthalic anhydride to produce an oligomeric acid. The oligomeric acid is then reacted at a reaction temperature in the range of from 60° C. to 200° C. with a monofunctional epoxy to produce the reactive oligomer. Further details of the useful oligomer are listed in U.S. Pat. No. 6,221,494 on column 3 and 4, which are incorporated herein by reference.

Typically useful NAD polymer (NAD) includes in the range of from about 10 percent to 90 percent, preferably in the range of from 50 percent to 80 percent all in weight percent based on the weight of the dispersed polymer, of a core formed from high molecular weight polymer having a weight average molecular weight of about 50,000 to 500,000, preferably in the range of from 50,000 to 200,000, more preferably in the range of from 50,000 to 150,000. The arms make up about 10 percent to 90 percent, preferably 10 percent to 59 percent, all in weight percent based on the weight of the dispersed polymer. The arms are formed from a low molecular weight polymer having weight average molecular weight of in the range of from about 1,000 to 30,000, preferably in the range of from 3000 to 20,000, more preferably in the range of from 3000 to 15,000.

The core of the dispersed acrylic polymer is comprised of polymerized acrylic monomer(s) optionally copolymerized with ethylenically unsaturated monomer(s). Suitable monomers include styrene, alkyl (meth)acrylate having alkyl carbon atoms in the range of from 1 to 18, preferably in the range of from 1 to 12; ethylenically unsaturated monocarboxylic acid, such as, (meth)acrylic acid, and silane-containing monomers. Other optional monomers include hydroxyalkyl (meth)acrylate or acrylonitrile. Optionally, the core may be crosslinked through the use of diacrylates or dimethacrylates, such as, allyl methacrylate or through post reaction of hydroxyl moieties with polyfunctional isocyanates.

The macromonomer arms attached to the core may be polymerized from monomers, such as alkyl (meth)acrylates having 1 to 12 carbon atoms. Typical hydroxy-containing monomers are hydroxy alkyl (meth)acrylates, described above. Typically useful NAD polymers are disclosed in the following US Patents which are hereby incorporated by reference: U.S. Pat. Nos. 4,849,480, 5,010,140, 5,763,528 and 6,221,494.

The binder component of the coating composition of the present invention can additionally contain a variety of aldimine oligomers, ketimine oligomers and polyaspartic esters, which are described in detail at col. 7, lines 17–33 of U.S. Pat. No. 6,221,494, which is incorporated herein by reference.

The coating composition of the present invention can further contain at least one organic solvent typically selected from the group consisting of aromatic hydrocarbons, such as, petroleum naphtha or xylenes; ketones, such as, methyl amyl ketone, methyl isobutyl ketone, methyl ethyl ketone or acetone; esters, such as butyl acetate or hexyl acetate; and glycol ether esters, such as, propylene glycol monomethyl ether acetate. The amount of organic solvent added depends upon the desired solids level as well as the desired amount of VOC of the composition. If desired, the organic solvent may be added to both components of the binder.

If desired, the amount of the organic solvent used in the present invention can be adjusted to less than 0.6 kilogram (5 pounds per gallon) and preferably in the range of 0.012 kilogram to 0.528 kilogram (0.1 pounds to 4.4 pounds per gallon), more preferably in the range of from 0.12 kilogram to 0.42 kilogram (1.0 to 3.5 pounds per gallon) of organic solvent per liter of the composition.

The solids level of the coating of the present invention can vary in the range of from 5 percent to 100 percent, preferably in the range of from 10 percent to 95 percent and more, preferably in the range of from 25 percent to 85 percent, all percentages being based on the total weight of the coating composition.

To improve weatherability of a clear coating, 0.1 to 5 weight percent, preferably 1 to 2.5 weight percent and more preferably 1.5 to 2 weight percent, based on the weight of the total weight of the binder and the crosslinking compo nents solids of an ultraviolet light stabilizer or a combination of ultraviolet light stabilizers and absorbers can be added. These stabilizers include ultraviolet light absorbers, screeners, quenchers and specific hindered amine light stabilizers. Also, about 0.1 to 5% by weight, based on the total weight of the binder and the crosslinking components solids, of an antioxidant can be added. Most of the foregoing stabilizers are supplied by Ciba Specialty Chemicals, Tarrytown, N.Y.

The coating composition of the present invention can be supplied in the form of a two-pack coating composition in which the first-pack includes the binder component and the second pack includes the crosslinking component containing polyisocyanate. Generally the first and the second pack are stored in separate containers and mixed before use. The containers are preferably sealed air tight to prevent degradation during storage. The mixing may be done, for example, in a mixing nozzle or in a container. When the crosslinking component contains the polyisocyanate, the curing step can take place under ambient conditions, or if desired, it can take place at elevated baking temperatures.

Alternatively, when the isocyanates functionalities of the polyisocyanate are blocked, both the components of the coating composition can be stored in the same container in the form of a one-pack coating composition. When the crosslinking component contains the blocked polyisocyanate, the curing step takes place at elevated baking temperatures.

If the crosslinking component contains melamine, the coating composition can be formulated as a one pack coating composition since the melamine does not react with the highly branched copolyester polyol under normal storage conditions and elevated baking temperature is required to cure or crosslink a layer of the coating composition into a coating.

When the crosslinking component contains the polyisocyanate and melamine, the curing step occurs in two stages, first stage taking place under ambient conditions and the second stage taking place at elevated baking temperatures.

The first-pack of the two-pack coating composition contains the binder component and the second-pack contains the crosslinking component, which includes the polyisocyanate. If desired, the melamine can be in the first-pack. The two packs are mixed just prior to use or about 5 to 30 minutes before use to form a potmix. A layer of the potmix is typically applied to a substrate by conventional techniques, such as, spraying, electrostatic spraying, roller coating, dipping or brushing. If used as a clear coating, a layer having a thickness in the range of from 25 micrometers to 75 micrometers is applied over a metal substrate, such as, automotive body, which is often pre-coated with other coating layers, such as an electrocoat, primer and a basecoat. The two pack coating composition may be dried and cured at ambient temperatures or may be baked upon application for about 10 to 60 minutes at baking temperatures ranging from about 80° C. to 160° C. The mixture can also contain pigments and can be applied as a mono coat or a basecoat layer over a primed substrate.

When a one-pack coating composition containing a blocked polyisocyanate or a melamine is used, a layer thereof applied over a substrate using afore-described application techniques, is cured at a baking temperature in the range of from 80° C. to 200° C., preferably in the range of 80° C. to 160° C., for about 60 to 10 minutes. It is understood that actual baking temperature would vary depending upon the catalyst and blocking agent used and the amount thereof, thickness of the layer being cured and the blocked isocyanate functionalities and the optional melamine utilized in the coating composition. The use of the foregoing baking step is particularly useful under OEM conditions.

If desired, the composition can be pigmented to form a colored mono coat, basecoat, or primer. About 0.1% to 200% by weight, based on the total weight of the binder and crosslinking component solids, of conventional pigments can be added using conventional techniques in which a mill base containing pigment, dispersant and solvent is first formed. The mill base is then mixed with the composition to form a colored composition. This composition can be applied and cured as described above.

The coating composition of the present invention is suitable for providing coatings on variety of substrates, such as metal, plastic, composite, wood and concrete substrates. The present composition is especially suitable for providing clear coatings in automotive OEM or refinish applications typically used in coating autobodies.

These compositions are also suitable as clear or pigmented coatings in industrial and maintenance coating applications.

The coating composition of the present invention can also contain conventional additives, such as, stabilizers, rheology control agents, flow agents, toughening agents and fillers. Such additional additives will depend on the intended use of the coating composition. Fillers, pigments, and other additives that would adversely effect the clarity of the cured coating will not be included if the composition is intended to be used as a clear coating. The foregoing additives may be added to either the binder or crosslinking component, or both, depending upon the intended use of the coating composition.

Testing Procedures

The following test procedures were used for generating data reported in the examples below:

Crockmeter-Dry Mar Resistance

Panels, which have cured clearcoat over black basecoat, were coated with a thin layer of Bon Ami abrasive supplied by Faultless Starch/Bon Ami Corporation, Kansas City, Mo. The clearcoats had a dry coating thickness of 50 microns. The panels were then tested for mar damage for 10 double rubs against a green felt wrapped fingertip of A.A.T.C.C. Crockmeter (Model CM-1, Atlas Electric Devices Corporation, Chicago, Ill.) The dry mar resistance was recorded as percentage of gloss retention by measuring 20 deg. gloss of the marred areas versus non-marred areas of the coated panels.

Crockmeter-Wet Mar Resistance

Similar Procedure to that used in Crockmeter-Dry Mar Resistance above was used to test wet mar resistance, except the abrasive medium used was a wet alumina slurry instead of Bon Ami abrasive. The composition of the wet alumina slurry was as follows:

| | |
|---|---|
| Deionized Water | 294 g |
| ASE-60(1) Thickener | 21 g |
| AMP-95% (10% solution of DI water)(2) | 25 g |
| Aluminum oxide (120 # grit)(3) | 7 g |

(1)Supplied by Rohm and Haas Company, Philadelphia, Pennsylvania
(2)Supplied by Aldrich Chemicals, Milwaukee, Wisconsin
(3)Supplied by MDC Industries, Philadelphia, Pennsylvania The pH of the slurry was maintained in the range of 7.6–8.0, and the viscosity was maintained at 125+/−10 poise (Brookfield #4 spindle at 10 rpm). To test the wet mar resistance, 0.7 m of the slurry was applied over the base-coated panels having cured clear-coats. The clear-coats had a dry coating thickness of 50 microns. The portions of panels coated with the slurry were then tested for mar damage for 10 double rubs against a green felt wrapped fingertip of A.A.T.C.C. Crockmeter (Model CM-1, Atlas Electric Devices). The wet mar resistance was recorded as percentage of gloss retention by measuring the 20 degree gloss of the marred areas versus non-marred areas of the coated panels.

Wet Mar Test

The surface of a panel is marred using a 3% slurry of aluminum oxide in water and a felt pad, the marring is accomplished by using a Daiei® Rub Tester. The test uses 10 cycles with a weight of 500 grams. The rating shown is the percent of the surface, which is not marred as measured by image analysis.

Dry Mar Test

The surface of a panel is marred using Bon Ami® Cleanser and a felt pad and the marring is accomplished by using a Daiei® Rub Tester. The test uses 15 cycles with a weight of 700 grams. The rating shown is the percent of the surface which is not marred as measured by image analysis QMS Measurement The QMS Meter (from Autospect Co., Ann Arbor, Mich.) provides measurement of DOI (sharpness) gloss (luster), orange peel (waviness), and a combined value representing a composite number based on percentages of the sharpness, luster and waviness of the surface. This rating has a high correlation with visual perception.

Swell Ratio

The swell ratio of a free film (removed from a sheet of TPO—thermoplastic olefin) was determined by swelling the film in methylene chloride. The free film was placed between two layers of aluminum foil and using a LADD punch, a disc of about 3.5 mm in diameter was punched out of the film and the foil was removed from the film. The diameter of the unswollen film ($D_o$) was measured using a microscope with a 10x magnification and a filar lens. Four drops of methylene chloride were added to the film and the film was allowed to swell for a few second and then a glass slide was placed over the film and the swollen film diameter ($D_s$) was measured. The swell ratio was then calculated as follow:

$$\text{Swell Ratio} = (D_s)^2/(D_o)^2$$

Solvent Swelling

This procedure measures the swelling ratio of a film by measuring the area before and after applying 3 drops of methylene chloride to a film using a microscope with 25x objective and graduated reticule.

Persoz Hardness Test

The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) were recorded.

Hardness (Fischer)

Hardness was measured using a Fischerscope® hardness tester (the measurement is in Newtons per square millimeter).

TSR—Etch Depth Measurement Synthetic Acid Rain Test

A Synthetic Rain—formulation prepared as follows:

| Cationic Aqueous Solution | |
| --- | --- |
| 28% Aqueous ammonia | 35.7 g |
| 95% Calcium hydroxide | 10.5 g |
| 95% Sodium hydroxide | 12.6 g |
| 85% Potassium hydroxide | 1.2 g |

The above constituents are mixed with deionized water to form 1000 g of an aqueous cationic solution.

Anionic Aqueous Solution

| | |
| --- | --- |
| 98% Sulfuric acid | 102.0 g |
| 70% Nitric acid | 42.9 g |
| 35% Hydrochloric acid | 200.0 g |

The above constituents are blend with deionized water to form 1000 g aqueous anionic solution.

Synthetic Rain Liquid

| | |
| --- | --- |
| Cationic Aqueous Solution (a) | 100 g |
| Anionic Aqueous Solution (b) | 33 g |

The anionic aqueous solution is added to the cationic aqueous solution until the pH=1 and then mixed for 24 hr. and the pH is readjusted to 1.

About 0.2 ml of the synthetic acid rain was applied on the surface of a coated panel and placed in a gradient oven at 60° C. for 1 hour. The degree of etch was observed visually.

Viscosity Measurement

The viscosity of the pot mix (mixture of all of the components of the coating composition) of the coating compositions was measured by using the conventional Zahn #2 cup supplied by VWR Scientific Products Corporation. The viscosity was measured as soon as the pot mix was prepared. The reading was recorded as number of seconds it took for the pot mix to drain from the Zahn #2 cup [ASTM D1084 (Method D)].

Gravelometer Test

The test follows procedure of ASTM-D-3170-87 using a 90° panel angle with panels and stones kept in a freezer held at −20° C. for a minimum of 2 hours. Panel was tested with 0.55 liter (1 pint) of stones.

MEK Solvent Resistance Test

A coated panel is rubbed (100 times) with an MEK (methyl ethyl ketone) soaked cloth using a rubbing machine and any excess MEK is wiped off. The panel is rated from 1–10. Rating 10—no visible damage to the coating, rating 9—1–3 distinct scratches, rating 8—4–6 distinct scratches, rating 7—7–10 distinct scratches, rating 6—10–15 distinct scratches with slight pitting or slight loss of color, rating 5—15–20 distinct scratches with slight to moderate pitting or moderate loss of color, rating 4—scratches start to blend into one another, rating 3—only a few undamaged areas between blended scratches, rating 2—no visible signs of undamaged paint, rating 1 complete failure—bare spots are shown. The final rating is obtained by multiplying the number of rubs by the rating.

Gloss Measurement

Gloss was measured at 20° using a Byk-Gardener Glossmeter.

Distinctness of Image (DOI)

DOI was measured using a Hunterlab Model RS 232 (HunterLab, Reston, Va.).

NOSAND Recoat Adhesion Test

Recoat adhesion was determined by applying two coats of the coating composition. The second coat was applied without sanding the first coat of paint after it was baked. The baking conditions of the first coat that was applied were 160° C. (320° F.) for 1 hour and the baking conditions of the second coat were 130° C. (265° F.) for 30 minutes. The coating on the panel was then cross cut and tape applied and removed and the amount of coating removed was rated.

Water Spot

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour timed intervals. A drop about ½ inch in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

Cotton Tack FreeTime

Allow coated panel to dry for set period of time (e.g. 30 minutes). Drop a cotton ball from a height of 1 inch onto the surface of the panel and leave the cotton ball on the surface for a set time interval and invert panel. Repeat above until the time the cotton ball drops off of the panel on inversion and note that as the cotton tack free time.

BK Time

Surface drying times of coated panels measured according to ASTM D5895.

Gel Fraction

Measured according to the procedure set forth in U.S. Pat. No. 6,221,494 col. 8 line 56 to col. 9 line 2 which procedure is hereby incorporated by reference.

The invention is illustrated by the following Examples. All parts and percentages are on a weight basis unless otherwise noted.

EXAMPLES

The following highly branched copolyester polyol solutions were prepared and used to form coating compositions.

Highly Branched Copolyester Polyol-Solution 1

A highly branched copolyester polyol was synthesized by esterifying dimethylolpropionic acid and $\epsilon$-caprolactone with a Tin(II) Catalyst as follows:

The following constituents were charged into a 3 liter three-neck flask equipped with a mechanical stirrer, thermocouple, short path distillation head with a water condenser under nitrogen flow: dimethylolpropionic acid (DMPA, 320 g, 2.39 mole), $\epsilon$-caprolactone (640 g, 5.6 mole), tin (II) di(2-ethylhexanoate)(Sn $(O_2 CC_7H_{15})_2$), 6 g, 0.015 mole), xylene (40 ml) and heated at 180° C. The reaction progress was monitored by the acid number measurements and by the water volume collected. After 7 hours, 32 ml water was collected, 1 g sample was withdrawn and dissolved in 10 ml DMSO (dimethyl sulfoxide), and the acid number (8.3) was determined by titration with 0.1 N KOH in methanol. The hot, viscous, slightly yellow clear polymer was poured out of the reactor into a container. The polymer had $M_n$ 13,100, $M_w/M_n$ of 3.1 as determined by GPC vs. polystyrene standards in THF (tetrahydrofuran) at room temperature, $T_g$=-43° C. determined by DSC (Differential Scanning Calorimetry), and a calculated —OH EW (hydroxyl equivalent weight) of 340.

To reduce the viscosity, the copolyester polyol was dissolved in propylene glycol monomethyl ether acetate to a weight solids of 64%.

Highly Branched Copolyester Polyol-Solution 2

A highly branched copolyester polyol was synthesized by esterifying dimethylolpropionic acid and $\epsilon$-caprolactone and pentaerythritol with a tin (II) catalyst as follows:

The following constituents were charged into a 3 liter three-neck flask equipped with a mechanical stirrer, thermocouple, short path distillation head with a water condenser under nitrogen flow: dimethylolpropionic acid (DMPA, 400 g, 2.98 mole), pentaerythritol (32.4 g, 0.24 mole), tin (II) di(2-ethylhexanoate)(Sn $(O_2CC_7H_{15})_2$), 6 g, 0.015 mole), xylene (10 g) and heated at 180° C. The reaction progress was monitored by the acid number measurements and by the water volume collected. After 12 hours, 51 ml water was collected, 1 g sample was withdrawn and dissolved in 10 ml DMSO, and the acid number (3.7) was determined by titration with 0.1 N KOH in methanol. The reaction heating was reduced to 120° C. and $\epsilon$-caprolactone (800 g, 7.0 mole) was slowly added within 3-5 min. After 85 min., 0.1 g sample was withdrawn and 0.01 g of undecane was added and dissolved in 1 ml THF, and then was analyzed by GC (Gas Chromatography) to verify essentially complete conversion of $\epsilon$-caprolactone. The hot, viscous, slightly yellow clear polymer was poured out of the reactor into a container. The polymer had $M_n$ 5,500, $M_w/M_n$ of 2.1 as determined by GPC vs. polystyrene standards in DMAC at 135° C., intrinsic viscosity 0.082 dL/g, $T_g$=-47° C. by DSC, and a calculated —OH EW of 350.

To reduce the viscosity, the copolyester polyol was dissolved in propylene glycol monomethyl ether acetate to a weight solids of 64%.

Highly Branched Copolyester Polyol-Solution 3

A highly branched copolyester polyol was synthesized by esterifying dimethylolpropionic acid and $\epsilon$-caprolactone and pentaerythritol with a tin (II) catalyst as follows:

The following constituents were charged into a 3 liter three-neck flask equipped with a mechanical stirrer, thermocouple, short path distillation head with a water condenser under nitrogen flow: dimethylolpropionic acid (DMPA, 250 g, 1.86 mole), pentaerythritol (20.2 g, 0.15 mole), tin (II) di(2-ethylhexanoate)(Sn $(O_2CC_7H_{15})_2$), 6 g, 0.015 mole), xylene (10 g) and heated at 180° C. The reaction progress was monitored by the acid number measurements and by the water volume collected. After 11 hours, 30 ml water was collected, 1 g sample was withdrawn and dissolved in 10 ml DMSO, and the acid number (3.9) was determined by titration with 0.1 N KOH in methanol. The reaction heating was reduced to 120° C. and $\epsilon$-caprolactone (800 g, 7.0 mole) was slowly added within 3-5 min. After 80 min., 0.1 g sample was withdrawn and 0.01 g of undecane was added and dissolved in 1 ml THF, and then was analyzed by GC to verify essentially complete conversion of $\epsilon$-caprolactone. The hot, viscous, slightly yellow clear polymer was poured out of the reactor into a container. The polymer had $T_g$=-51° C. by DSC, and a calculated —OH EW of 490.

To reduce the viscosity, the copolyester polyol was dissolved in propylene glycol monomethyl ether acetate to a weight solids of 64.5%.

Highly Branched Copolyester Polyol-Solution 4

A highly branched copolyester polyol was synthesized by esterifying dimethylolpropionic acid and $\epsilon$-caprolactone and 1,4-cyclohexanedimethanol with sulfonic acid catalyst as follows:

The following constituents were charged into a 3 liter three-neck flask equipped with a mechanical stirrer, thermocouple, short path distillation head with a water condenser under nitrogen flow: dimethylolpropionic acid (DMPA, 200 g, 1.49 mole), 1,4-cyclohexanedimethanol (107 g, 0.74 mole), $\epsilon$-caprolactone (400 g, 3.5 mole), methanesulfonic acid (3 g, 0.031 mole), xylene (10 g) and heated at 140° C. The reaction progress was monitored by the acid number measurements and by the water volume collected. After 11 hours, 23 ml water was collected, 1 g sample was withdrawn and dissolved in 10 ml DMSO, and the acid number (1.9) was determined by titration with 0.1 N KOH in methanol. The hot, viscous, slightly yellow clear polymer was poured out of the reactor. The polymer had $M_n$ 2,000, $M_w/M_n$ of 1.5 as determined by GPC vs. polystyrene standards in DMAC at 135° C., $T_g$=-41° C. by DSC, calculated —OH EW of 400.

To reduce the viscosity, the copolyester polyol was dissolved in propylene glycol monomethyl ether acetate to a weight solids of 63.5%.

Highly Branched Copolyester Polyol-Solution 5

A highly branched copolyester polyol was synthesized by esterifying dimethylolpropionic acid, pentaerythritol and $\epsilon$-caprolactone as follows:

The following constituents were charged into a 12-liter reactor equipped with a mechanical stirrer, thermocouple, short path distillation head with a water separator under nitrogen flow:

| | |
|---|---|
| Dimethylolpropionic acid (DMPA) | 2127.8 |
| Pentaerythritol (PE) | 344.7 |
| Tin (II) 2-ethylhexanoate | 37.8 |
| ε-Caprolactone (CL) | 1418.5 |
| Xylene | 121.5 |

The reaction mixture was heated to its reflux temperature and the water of reaction was collected from the water separator. The reaction progress was monitored by the amount of water collected, and the reaction temperature was not allowed to exceed 185° C. An additional 20 g of xylene was added throughout the reaction to maintain the reflux temperature below 185° C. When the amount of water collected approached theoretical amount of 286 g, acid number measurements were used to determine the end point that was an acid number of less than 5. At a measured acid number of 1.5, the reactor was allowed to cool to 120° C. Then, 2837.2 g of ε-caprolactone was added slowly over a 15–20 minute period through an addition funnel. The reactor was held at 120° C. until reaction solids exceeded 95%. Then the reactor was allowed to cool to 90° C. and the resulting polymer solution was thinned with 598.2 g of ethyl 3-ethoxy propionate (EEP). Forced air was used to cool the reactor to below 50° C.

The polymer had an Mn of 3210, Mw/Mn of 1.82 (determined by GPC using PMMA as a standard with an SEC low MW column), an OH# equal to 195.5, and a calculated —OH EW of 246.5. The polymer solution had a 91.4% solids content, a Gardner Holdt viscosity of Z3+½, and the final acid number was 0.9 corrected for solid.

Highly Branched Copolyester Polyol-Solution 6

A highly branched copolyester polyol was synthesized by esterifying dimethylolpropionic acid, pentaerythritol and ε-caprolactone as follows:

The following constituents were charged into a 12-liter reactor equipped with a mechanical stirrer, thermocouple, short path distillation head with a water separator under nitrogen flow:

| | |
|---|---|
| Dimethylolpropionic acid (DMPA) | 2063.4 |
| Pentaerythritol (PE) | 167.1 |
| Tin (II) 2-ethylhexanoate | 31.0 |
| Xylene | 108.3 |

The reaction mixture was heated to its reflux temperature and the water of reaction was collected from the water separator. The reaction progress was monitored by the amount of water collected, and the reaction temperature was not allowed to exceed 185° C. An additional 20 g of xylene was added throughout the reaction to maintain the reflux temperature below 185° C. When the amount of water collected approached theoretical (277 g), acid number measurements were used to determine the end point, which was an acid number of less than 5. At a measured acid number of 1.7, the reactor was allowed to cool to 120° C. Then, 4126.8 g of ε-caprolactone was added slowly over a 15–20 minute period through an addition funnel. The reactor was held at 120° C. until the solids exceeded 95%. Then the reactor was allowed to cool to 90° C. and the resulting polymer solution was thinned with 1391.8 g methyl ethyl ketone. Forced air was used to cool the reactor to below 50° C.

The polymer had a Mn of 5035, Mw/Mn of 1.68 (determined by GPC using polystyrene as a standard with a SEC high MW column), an OH# equal to 184.5, and a calculated —OH EW of 300.2. The polymer solution had 80.2% solids content, a Gardner Holdt viscosity of V+¼, and the final acid number was 2.1 corrected for solids.

Highly Branched Copolyester Polyol-Solution 7

A random highly branched copolyester polyol was synthesized by esterifying dimethylolpropionic acid, pentaerythritol and ε-caprolactone as follows:

The following constituents were charged into a 12-liter reactor equipped with a mechanical stirrer, thermocouple, short path distillation head with a water separator under nitrogen flow:

| | |
|---|---|
| Dimethylolpropionic acid (DMPA) | 1668.8 |
| Pentaerythritol (PE) | 67.6 |
| Tin (II) 2-ethylhexanoate | 25.1 |
| ε-Caprolactone (CL) | 3337.6 |
| Xylene | 87.6 |

The reaction mixture was heated to its reflux temperature and the water of reaction was collected from the water separator. The reaction progress was monitored by the amount of water collected, and the reaction temperature was not allowed to exceed 185° C. An additional 40 g of xylene was added throughout the reaction to maintain the reflux temperature below 185° C. When the amount of water collected approached theoretical amount of 224 g, acid number measurements were used to determine the end point, which was an acid number of less than 5. At a measured acid number of 3.0, the reactor was allowed to cool to 90° C. The reactor was held at 120° C. until reaction solids exceeded 95%. The reactor was allowed to cool to 90° C. and the polymer solution was thinned with 2537.3 g of polyethyleneglycol monomethyl ether. Forced air was used to cool the reactor to below 50° C.

The polymer had a Mn of 7065, Mw/Mn of 3.27 (determined by GPC using polystyrene as a standard with a SEC high MW column), an OH# equal to 166.8, and a calculated —OH EW of 335.8. The polymer solution had 65.6% solids content, a Gardner Holdt viscosity of V+½, and the final acid number of 2.5.

Examples 1 and 1A

Coating Compositions of Examples 1 and 1A were prepared as follows:

| | Example 1 Parts by Weight | Example 1A Parts by Weight |
|---|---|---|
| Portion 1 | | |
| Highly Branched Copolyester Solution 1 (prepared above) | 27.21 | 25.83 |
| Propylene Glycol Monomethyl Ether Acetate (PM Acetate) | 11.37 | 9.57 |
| 20% Solution Byk 301 (Flow Additive | 0.27 | 0.27 |

-continued

|  | Example 1 Parts by Weight | Example 1A Parts by Weight |
|---|---|---|
| from Byk-Chemie in PM Acetate) |  |  |
| 1% Dibutyl Tin Dilaurate in Solution in Methyl Ethyl Ketone | 1.37 | 1.37 |
| Portion 2 |  |  |
| Tolonate ™ HDT LV (Isocyanurate Trimer of Hexamethylene diisocyanate from Rhodia, Inc.) | 9.77 | 5.33 |
| IPDI-11890L (Trimer of Isophorone Diisocyanate from Degussa Corp. - Coatings and Colorants | 0.0 | 7.62 |

For each of Examples 1 and 1A, the constituents of Portion 1 were charged into a mixing vessel in the order shown above and mixed then Portion 2 was premixed and charged into the mixing vessel and thoroughly mixed with Portion 1 to form each of Examples 1 and 1A. Each of the coating compositions was applied with a doctor blade over a separate phosphated cold roll steel panel primed with a layer of PowerCron® Primer supplied by PPG, Pittsburgh, Pa., to a dry coating thickness of 50 micrometers and air dried at ambient temperature conditions. A second set of coated panels was baked for 30 minutes at 140° C. Then the panels were tested using the test set forth in following Table 1 and the results of the test are shown in Table 1.

Examples 2 and 2A

Coating compositions of Examples 2 and 2A were prepared as follows:

|  | Example 2 Parts by Weight | Example 2A Parts by Weight |
|---|---|---|
| Portion 1 |  |  |
| Highly Branched Copolyester Solution 2 (prepared above) | 35.77 | 33.99 |
| Propylene Glycol Monomethyl Ether Acetate (PM Acetate) | 14.64 | 12.35 |
| 20% Solution Byk 301 (Flow Additive from Byk-Chemie in PM Acetate) | 0.36 | 0.36 |
| 1% Dibutyl Tin Dilaurate in Solution in Methyl Ethyl Ketone | 1.78 | 1.78 |
| Portion 2 |  |  |
| Tolonate ™ HDT LV (Isocyanurate Trimer of Hexamethylene diisocyanate from Rhodia, Inc.) | 12.45 | 6.8 |
| IPDI-T1890L (Trimer of Isophorone Diisocyanate from Degussa Corp. - Coatings and Colorants | 0.0 | 9.72 |

For each of Examples 2 and 2A, the constituents of Portion 1 were charged into a mixing vessel in the order shown above and mixed then Portion 2 was premixed and charged into the mixing vessel and thoroughly mixed with Portion 1 to form each of Examples 2 and 2A. Each of the coating compositions was applied to the panels described in Example 1 using the same procedure of Example 1 and dried and cured according to the procedure of Example 1 and tested as in Example 1 and the results are recorded in Table 1 following.

Example 3

Coating compositions of Examples 3 and 3A were prepared as follows:

|  | Example 3 Parts by Weight | Example 3A Parts by Weight |
|---|---|---|
| Portion 1 |  |  |
| Highly Branched Copolyester Solution 3 (prepared above) | 39.64 | 38.06 |
| Propylene Glycol Monomethyl Ether Acetate (PM Acetate) | 13.29 | 11.49 |
| 20% Solution Byk 301 (Flow Additive from Byk-Chemie in PM Acetate) | 0.36 | 0.36 |
| 1% Dibutyl Tin Dilaurate Solution in Methyl Ethyl Ketone | 1.78 | 1.78 |
| Portion 2 |  |  |
| Tolonate ™ HDT LV (Isocyanurate Trimer of Hexamethylene diisocyanate from Rhodia, Inc.) | 9.93 | 5.48 |
| IPDI-T1890L (Trimer of Isophorone Diisocyanate from Degussa Corp. - Coatings and Colorants | 0.0 | 7.83 |

For each of Examples 3 and 3A, the constituents of Portion 1 were charged into a mixing vessel in the order shown above and mixed then Portion 2 was premixed and charged into the mixing vessel and thoroughly mixed with Portion 1 to form each of Examples 3 and 3A. Each of the coating compositions was applied to the panels described in Example 1 using the same procedure of Example 1 and dried and cured according to the procedure of Example 1 and tested as in Example 1 and the results are recorded in Table 1 following.

Example 4

Coating compositions of Examples 4 and 4A were prepared as follows:

|  | Example 4 Parts by Weight | Example 4A Parts by Weight |
|---|---|---|
| Portion 1 |  |  |
| Solution 4 (prepared above) | 37.49 | 35.79 |
| Propylene Glycol Monomethyl Ether Acetate (PM Acetate) | 14.05 | 11.97 |
| 20% Solution Byk 301 (Flow Additive from Byk-Chemie in PM Acetate) | 0.36 | 0.36 |
| 1% Dibutyl Tin Dilaurate Solution in Methyl Ethyl Ketone | 1.78 | 1.78 |

-continued

| | Example 4 Parts by Weight | Example 4A Parts by Weight |
|---|---|---|
| Portion 2 | | |
| Tolonate ™ HDT LV (Isocyanurate Trimer of Hexamethylene diisocyanate from Rhodia, Inc.) | 11.32 | 6.22 |
| IPDI-T1890L (Trimer of Isophorone Diisocyanate from Degussa Corp. - Coatings and Colorants | 0.0 | 8.88 |

For each of Examples 4 and 4A, the constituents of Portion 1 were charged into a mixing vessel in the order shown above and mixed then Portion 2 was premixed and charged into the mixing vessel and thoroughly mixed with Portion 1 to form each of Examples 4 and 4A. Each of the coating compositions was applied to the panels described in Example 1 using the same procedure of Example 1 and dried and cured according to the procedure of Example 1 and tested as in Example 1 and the results are recorded in Table 1 following.

TABLE 1

Properties of Coating Compositions of Examples 1–4

| | Examples 1/1A | Examples 2/2A | Examples 3/3A | Examples 4/4A |
|---|---|---|---|---|
| Polymer Functionality (Mn/HEW) | 38.5 | 15.7 | 19.1 | 5 |
| BK 3 Time (Minutes) | 38/47 | 21/27 | 18.9/30 | 116/257 |
| BK 4 Time (Minutes) | 87/76 | 35/55 | 28.3/58 | 210/361 |
| Cotton Tack Free Time (Minutes) | 240/120 | 90/61 | 132/60 | >8 Hrs./>8 Hrs. |
| Hardness (Persoz) | | | | |
| 4 Hrs. RT | 63/38 | 64/34 | 77/51 | 19/wet |
| 1 Day RT. | 48/29 | 50/37 | 86/40 | 45/25 |
| Appearance | Good/Good | Good/Good | Good/Good | Good/Good |
| Hardness (Fischer) | | | | |
| 1 Day | 5.8/4.7 | 7.2/9.9 | 4.4/5.5 | 1.8/2.4 |
| 30 Days | 6.8/38.6 | 8.1/37.2 | 6.4/6.6 | 2.6/3.1 |
| Bake 140° C. | 7.3/28.2 | 4.8/22.2 | 5.2/5.7 | 2.1/3.2 |
| Water Spot after-4 HRS | 10/8 | 9/10 | 9/10 | 8/2 |
| MEK Resistance - 4 Hrs. RT | 900/800 | 900/800 | 950/900 | 100/100 |
| Swell Ratio | | | | |
| 1 Day | 1.66/1.71 | 1.57/1.65 | 1.66/1.77 | 2.11/Wet |
| 30 Days | 1.59/1.45 | 1.58/1.62 | 1.67/1.74 | 1.87/2.25 |
| Bake 140° C. | 1.62/1.58 | 1.6/1.61 | –/1.76 | |
| Gel Fraction - 30 Days RT. | 99.7/100 | 100/100 | 100/100 | 89.8/80.5 |
| Gravelometer Test | | | | |
| 30 Days RT | 7.5/7.5 | 7/7.5 | 7.5/7.5 | 7/7 |
| Bake 140° C. | 7/8 | 7.5/7.5 | 7.5/7.5 | 7/7 |
| Mar Resist - 140° C. | | | | |
| Wet | 96.3/91.9 | 97.3/89.1 | 97.7/97.5 | 94.9/91 |
| Dry | 99.2/99.8 | 99.3/99.6 | 72.2/99.1 | 61.4/48.7 |

RT—room temperature.

These results show that the highly branched copolyester is very reactive at room temperature with fast film forming times (BK times), excellent swell ratios at early cure times (1 day at room temperature), and shows excellent final film properties such as Gel Fractions in most cases above 99%, good appearance, and excellent gravel and mar resistance.

Example 5

A highly branched copolyester binder solution was prepared by mixing the following constituents:

| | Parts by Weight |
|---|---|
| Solution 5 (prepared above) | 9258.8 |
| Benzyl amine | 754.7 |
| 2-Ethylhexyl-1,3 hexanediol | 3590.4 |
| 2-Ethylhexanol | 1802.6 |
| Desmodur ® H (hexamethylene diisocyanate from Bayer AG) | 593.5 |
| Total | 16000.0 |

The above constituents were charged into a mixing vessel having a high speed dispersing blade and mixed for 8 minutes and the resulting solution was allowed to stand for 60 minutes. The resulting binder solution had a solids content of 91.5%.

A clear coating composition of Example 5 was prepared by thoroughly blending together the following constituents:

|  | Parts by Weight |
|---|---|
| Portion 1 | |
| 2-Ethyl-1,3-hexanediol | 2.10 |
| Resimine ® 4514 (94% solids monomeric melamine crosslinking agent from Solutia) | 7.66 |
| Cymel ® 1158 (80% solids imino melamine crosslinking agent from Cytec) | 31.88 |
| UV/HALS (40% solution in 2-ethylhexyl acetate of Tinuvin ® 384/Tinuvin ® 292 2:1 ratio from Ciba Specialty Chemicals) | 7.50 |
| BYK ® 301 Solution (10% solids of flow additive in PM Acetate from Byk-Chemie) | 0.68 |
| Acrylic Polymer Solution (65% solids in a mixture of aromatic hydrocarbon solvents and n butanol of a polymer of styrene/hydroxypropyl acrylate/butyl acrylate/isobutyl methacrylate/2-propionicacid-2-methyl(trimethoxysillyl) in a ratio of 10/10/3/12/65 | 4.52 |
| Nacure ® 5543 (Amine blocked dodecylbenzene sulfonic acid from King Industries) | 2.00 |
| Highly Branched Copolyester Binder Solution (prepared above) | 4.29 |
| Portion 2 | |
| Tolonate ™ HDT LV (Isocyanurate Trimer of Hexamethylene diisocyanate from Rhodia, Inc.) | 45.00 |
| Total | 117.51 |

The resulting composition of Example 5 had a solids content of 84%, a VOC of 0.175 kg/l (1.46 lbs/gal).

Phosphatized steel panel was coated with a primer of an electrodeposited cathodic epoxy adduct crosslinked with a polyisocyanate and coated with a OEM Ford W/B black base coat baked at 83° C. for 10 minutes to provide a 15.2 micrometer (0.6 mil) dry film thickness. The panel was the topcoated with the clear coating composition of Example 5 and baked at 140° C. for 30 minutes to provide a 51 micrometer (2.0 mil) dry film thickness.

Identical phosphatized steel panel coated with the cathodic primer and black base coat and baked as above was topcoated with a commercial Gen®IV clear coating sold by E.I. du Pont de Nemours and Company (isocyanate crosslinked acrylosilane composition) to the same film thickness and baked as above. The Gen®IV clear coating has a 61% solids content and a VOC of 0.38 kg/l (3.21 lbs/gal).

Each of the panels was subjected to the following tests and the table shows the results of these tests:

| Test | Clear Coating of Example 5 | Clear coating Gen ® IV Clear coating |
|---|---|---|
| Solvent Swelling (Area %) | 25 | 42 |
| Gloss | 93 | 85 |
| DOI | 93 | 94 |
| QMS | 72 | 70 |
| Tukon Hardness (knoops) | 14 | 8 |
| Crockmeter Wet Mar Resistance | 87% | 49% |
| Crockmeter Dry Mar Resistance | 90% | 56% |
| TSR (60c × 1H) | No Spot | Spot |
| NOSAND Recoat (White) (160° C. × 1H/130° C. × 30') | No Failure | No Failure |

Comparative Examples 6 to 8 and Examples 9 and 10

The coating compositions of Comparative Examples 6 to 8 and of Examples 9 and 10 were prepared in accordance with the table below. Unlike Examples 9 and 10, Comparative Examples 6 to 8 did not include the highly branched copolyester polyol of the present invention.

| Constituents of the composition | Example 6 (Comp.) | Example 7 (Comp.) | Example 8 (Comp.) | Example 9 | Example 10 |
|---|---|---|---|---|---|
| Portion 1 | | | | | |
| 7600S (1) | 317.05 | | | | |
| HC-7600S (2) | | 314.00 | | | |
| Acrylic Polymer (3) | | | 154.76 | 157.36 | 154.95 |
| Polyester Oligomer (4) | | | 30.34 | | |
| Highly Branched Polyester Polyol Solution 6 | | | | 20.65 | |
| Highly Branched Polyester Polyol Solution 5 | | | | | 19.17 |
| 2% DBTDL in ethyl acetate (5) | | | 3.83 | 3.83 | 3.84 |
| Methyl ethyl ketone | | | 27.62 | 27.46 | 27.58 |
| Methyl amyl ketone | | | 96.67 | 96.12 | 96.55 |
| Xylene | | | 13.81 | 14.66 | 14.73 |
| 32% Byk ® 306 in xylene (6) | | | 6.11 | 6.14 | 6.15 |
| Acetic acid | | | 0.41 | 0.41 | 0.40 |

-continued

| Constituents of the composition | Example 6 (Comp.) | Example 7 (Comp.) | Example 8 (Comp.) | Example 9 | Example 10 |
|---|---|---|---|---|---|
| Portion 2 | | | | | |
| 7675S (7) | 82.95 | | | | |
| HC-7605S (8) | | 86.00 | | | |
| V7575S (9) | 0.00 | 0.00 | 76.44 | 73.37 | 76.63 |
| Total | 400.00 | 400.00 | 400.00 | 400.00 | 400.00 |

(1) 7600S - DuPont ChromaClear ® Super Productive Urethane Clear.
(2) HC-7600S DuPont ChromaClear ® Low Overspray and Fast Flash Cleacoat.
(3) Acrylic polymer - 58% solids in organic solvents of an acrylic polymer of S/MMA/IBMA/HEMA having a Mn of 6200 and Mw 12,000 and prepared according to Example (Col. 5) U.S. Pat. No. 5,279,862.
(4) Polyester oligomer - 65% solids hydroxyl functional polyester of methyl hexahydrophthalic anhydride and pentaerythritol, prepared according to Procedure 2 of U.S. Pat No. 6,221,494.
(5) DBTDL - Fascat ® 4202 from Atofina Chemicals, Inc.
(6) BYK ® 306 - flow additive from Byk-Chemie.
(7) 7675S DuPont ChrormaClear ® Super Productive Panel Activator-Reducer - isocyanate solution
(8) HC-7605S Dupont ChromaClear ® Medium Temp. Activator-Reducer - isocyanate solution.
(9) V7575S DuPont ChromaClear ® Panel Activator-Reducer - isocyanate solution.

The above coating compositions Comparative Examples 6 to 8 and Examples 9 and 10 were applied to panels described in Example 1 by spraying. The coatings were cured under ambient conditions for 7 days and then cured at 130° C. for one hour. The coatings were tested. The results of these tests are shown in Table 2 following.

TABLE 2

Properties of Coatings Comparative Examples 6 to 8 and Examples 9 and 10

| Properties | Example 6 (Comp.) | Example 7 (Comp.) | Example 8 (Comp.) | Example 9 | Example 10 |
|---|---|---|---|---|---|
| BK 2 Time | 80 | 40 | 38 | 33 | 28 |
| BK 3 Time | 177 | 66 | 64 | 59 | 54 |
| BK 4 Time | >720 | 265 | 217 | 317 | 154 |
| Hardness (Persoz) | | | | | |
| 4 Hr. RT | 34 | 57 | 54 | 40 | 43 |
| 1 day RT | 135 | 124 | 112 | 122 | 111 |
| Appearance | Good | Good | Good | Good | Good |
| Hardness (Fisher) | | | | | |
| 1 Day RT | 28.0 | 41.2 | 41.9 | 31.6 | 34.2 |
| 7 Day RT | 98.0 | 85.0 | 90.0 | 65.2 | 62.1 |
| 130° C. Bake | 158 | 132 | 155 | 112 | 123 |
| Water Spot | | | | | |
| 1 Hr. RT | 0 | 8 | 6 | 6 | 8 |
| 2 Hr. RT | 4 | 8 | 8 | 8 | 8 |
| 3 Hr. RT | 6 | 8 | 8 | 8 | 8 |
| 4 Hr. RT | 8 | 8 | 8 | 8 | 10 |
| MEK Rubs | 100 | 400 | 600 | 500 | 900 |
| 4 Hr. RT Swell Ratio | | | | | |
| 1 Day RT | 2.09 | 1.72 | 1.74 | 1.68 | 1.66 |
| 7 Day RT | 1.74 | 1.61 | 1.65 | 1.59 | 1.59 |
| 130° C. Bake Gel | 1.69 | 1.58 | 1.61 | 1.61 | 1.58 |

TABLE 2-continued

Properties of Coatings Comparative Examples 6 to 8 and Examples 9 and 10

| Properties | Example 6 (Comp.) | Example 7 (Comp.) | Example 8 (Comp.) | Example 9 | Example 10 |
|---|---|---|---|---|---|
| Fraction | | | | | |
| 7 Day RT | 87.18 | 88.91 | 91.18 | 92.34 | 92.11 |
| 130° C. | 94.03 | 90.70 | 97.14 | 97.30 | 97.23 |

RT—room temperature

The data in the above Table 2 shows that the coating compositions of Examples 9 and 10 that utilized the highly branched copolyester polyol formed crosslinked networks faster at ambient conditions as evidenced by water spot resistance, solvent resistance (MEK Rubs), Swell Ratio and Gel Fraction without sacrificing significantly in hardness of the resulting finish when compared to two commercial coating compositions of Comparative Examples 6 and 7 and that of the coating composition of Comparative Example 8, which utilizes a multifunctional oligoester.

The reaction rate of the highly branched copolyester (solution 2) with isocyanate was compared to other types of hydroxyl functional components such as an oligomer (Described in U.S. Pat. No. 6,221,494 B1; procedure #2) and a standard acrylic polymer (Described in U.S. Pat. No. 6,221, 494 B1; procedure #9). This comparison was made using the isocyanurate trimer of hexamethylene diisocyanate (HDI) and the Isocyanurate trimer of isophorone diisocyanate (IPDI) and blends of these two isocyanates (the ratios shown in the Table 3 below are on a weight basis of total isocyanate). The catalyst level was held constant at 500 ppm of dibutyl tin dilaurate (DBTDL) on total binder and crosslinking components solids. The ratio of equivalents of isocyanate to hydroxyl was kept constant at 1.05/1. The reaction rate was measured on films at ambient conditions [23.9° C. (75° F.) @ 50% relative humidity] using an infrared spectrometer. The consumption of isocyanate functionality during the cure was followed by the loss of the isocyanate peak (at about 2270 cm−1) in the infrared at time intervals of ½ hour, 1 hour, 2 hours, 4 hours, 24 hours, 7 days, and 30 days.

TABLE 3

CURE DATA (HMDI/IPDI Trimer Blends)
NCO CONSUMPTION @ Room Temperature

| Binder Component/ Crosslinking Component (Weight ratio) | ½ HR | 1 HR | 2 HRS | 4 HRS | 24 HRS | 7 DAYS | 30 DAYS |
|---|---|---|---|---|---|---|---|
| Pentaerythritol based Hydroxyl reactive Oligomer (U.S. Pat. No. 6221494 B1; Procedure #2) | | | | | | | |
| HDI/IPDI (50/50) | | | | 32.54 | 48.98 | 66.22 | 74.42 |
| HDI/IPDI (70/30) | 11.46 | | 27.63 | 33.72 | 58.04 | 80.85 | 87.52 |
| HDI/IPDI (85/15) | 11.16 | | 27.6 | 36.86 | 63.41 | 86.34 | 92.64 |
| HDI (100) | 18.79 | 30.42 | 40.07 | 50.44 | 74 | 85.96 | 93.43 |
| Acrylic Polymer (decribed in U.S. Pat. No. 6221494 B1, Procedure #9) | | | | | | | |
| HDI/IPDI (70/30) | 5.37 | 6.87 | 9.36 | 14.34 | 32.06 | 45.02 | 58.21 |
| HDI/IPDI (85/15) | 3.36 | 5.25 | 8.43 | 14.21 | 36.2 | 50.21 | 64.12 |
| HDI (100) | 8.13 | 8.78 | 12.72 | 17.67 | 37.33 | 66.56 | 80.12 |
| Highly Branched Copolyester (Solution 2 of the present invention) | | | | | | | |
| HDI/IPDI (50/50 ) Example 2A | 21.88 | 29.58 | 40.98 | 51.51 | 67.89 | 92.8 | 98.83 |
| HDI/IPDI (70/30) | 45.77 | 58.7 | 70.52 | 80.14 | 91.45 | 98.62 | 100 |
| HDI/IPDI (85/15) | 46.51 | 61.4 | 75.39 | 85.65 | 95.25 | 99.57 | 100 |
| HDI (100) Example 2 | 59.95 | 71.8 | 85.55 | 92.58 | 98.65 | 99.14 | 100 |

The results in Table 3 above show in that the highly branched copolyester is much more reactive than either the oligomer or the acrylic polymer. At ½ hour with HDI, the highly branched copolyester showed almost 60% reaction, the oligomer was 19%, the acrylic polymer was 8%. Even with the much less reactive IPDI, the highly branched copolyester was much more reactive than the oligomer or the acrylic polymer. At a HDI/IPDI ratio of 70/30 at ½ hour, the highly branched copolyester showed 46% reaction, the oligomer 11%, and the acrylic polymer 5%.

What is claimed is:

1. A coating composition comprising:
   (a) a binder component, which comprises a highly branched copolyester polyol having a number average molecular weight ranging from 1000 to 30,000, hydroxyl groups ranging from 5 to 200 per polymer chain and carboxyl groups ranging from 0 to 40 per polymer chain, said copofyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20; and
   (b) a crosslinking component selected from the group consisting of a polyisocyanate having at least two reactive isocyanate groups, a melamine and a combination thereof, wherein ratio of said isocyanate groups on said polyisocyanate in said crosslinking component to said hydroxyl groups on said highly branched copolyester polyol ranges from 0.25/1 to 3/1 and amount of said melamine in said crosslinking component ranges from 10 weight percent to 40 weight percent, based on the total of said binder and crosslinking components.

2. The coating composition of claim 1 wherein said monomer mixture further comprises a molecular weight controlling agent having in the range of 1 to 6 functionalities selected from the group consisting of hydroxyl, amine, epoxide, carboxyl and a combination thereof.

3. The coating composition of claim 1 wherein when said monomer mixture contains hyper branching monomer having two carboxyl groups and one hydroxyl group or three carboxyl groups and one hydroxyl group, said highly branched copolyester polyol is further reacted with monoepoxy or diol to provide said highly branched copolyester polyol with said range of hydroxyl groups.

4. The coating composition of claim 1 wherein when said crosslinking component is polyisocyanate, ratio of said isocyanate groups on said polyisocyanate to said hydroxyl groups on said highly branched copolyester polyol ranges from 0.25/1 to 3/1.

5. The coating composition of claim 1 or 2 wherein when said binder component further comprises aldimine, ketimine, polyaspartic ester, or a combination thereof.

6. The coating composition of claim 1 wherein when said crosslinking component is melamine, said composition contains in the range of 10 weight percent to 40 weight percent, based on the total of said binder and crosslinking components.

7. The coating composition of claim 1 wherein said hyper branching monomer is dialkylol propionic acid and said lactone is caprolactone.

8. The coating composition of claim 2 wherein said hyper branching monomer is dialkylol propionic acid, said lactone is caprolactone and said molecular weight controlling agent is pentaerythritol or trimethylol propane.

9. The coating composition of claim 2 wherein said hyper branching monomer is dimethylol propionic acid, said lactone is caprolactone and said molecular weight controlling agent is pentaerythritol.

10. The coating composition of claim 1 or 2 wherein said binder component further comprises a hydroxyl containing (meth)acrylic polymer, a polyester, an oligomer, non-aqueous dispersed polymer, or a combination thereof.

11. The composition of claim 1 or 4 further comprising a catalyst selected from the group consisting of a tin compound, tertiary amine and a combination thereof.

12. The composition of claim 1 or 6 further comprises a catalyst selected from the group consisting of sulfonic acids, phosphoric acids, and a combination thereof.

13. The coating composition of claim 1, wherein said binder component comprises in the range 2 weight percent to 100 weight percent said highly branched copolyester polyol.

14. The coating composition of claim 1 or 2 comprising a pigment.

15. The coating composition of claim 1 wherein said highly branched copolyester polyol is produced by polymerizing said chain extender and highly branched monomers in one step.

16. The coating composition of claim 2 wherein said highly branched copolyester polyol is produced by polymerizing said chain extender, molecular weight controlling agent and highly branched monomers in one step.

17. The coating composition of claim 1 wherein said highly branched copolyester polyol is produced in stages by first polymerizing said highly branched monomers followed by polymerizing said chain extender.

18. The coating composition of claim 2 wherein said highly branched copolyester polyol is produced in stages by first polymerizing said molecular weight controlling agent and said highly branched monomers followed by polymerizing said chain extender.

19. The coating composition of claim 1 wherein said highly branched copolyester polyol is produced in stages by first polymerizing said highly branched monomers and a portion of said chain extender followed by polymerizing the remainder of said chain extender.

20. The coating composition of claim 2 wherein said highly branched copolyester polyol is produced in stages by first polymerizing said molecular weight controlling agent and said highly branched monomers and a portion of said chain extender followed by polymerizing the remainder of said chain extender.

21. The coating composition of claim 2 wherein said highly branched copolyester polyol is produced in stages by first polymerizing said molecular weight controlling agent and a portion of said highly branched monomers and a portion of said chain extender followed by polymerizing the remainder of said highly branched monomers and chain extender.

22. The coating composition of claim 2 wherein said highly branched copolyester polyol is produced in stages by first polymerizing portions of said molecular weight controlling agent, highly branched monomers and chain extender followed by polymerizing the remainder of said molecular weight controlling agent, highly branched monomers and chain extender.

23. A process for producing a coating on the surface of a substrate, said process comprising:

mixing binder and crosslinking components of a coating composition to form a potmix, wherein said binder component comprises a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20; and said crosslinking component selected from the group consisting of a polyisocyanate having at least two reactive isocyanate groups, a melamine and a combination thereof;

applying a layer of said pot mix on said surface; and curing said layer to form said coating on said surface of said substrate.

24. The process of claim 23 wherein said monomer mixture further comprises a molecular weight controlling agent having in the range of 1 to 6 functionalities selected from the group consisting of hydroxyl, amine, epoxide, carboxyl and a combination thereof.

25. The process of claim 23 or 24 wherein when said crosslinking component contains said polyisocyanate, said curing step takes place under ambient conditions.

26. The process of claim 23 or 24 wherein when said crosslinking component contains said melamine, said curing step takes place at elevated temperatures.

27. The process of claim 23 or 24 wherein when said crosslinking component contains said polyisocyanate and melamine said curing step occurs in two stages, first stage taking place under ambient conditions and second stage taking place at elevated temperatures.

28. The process of claim 23 or 24 wherein said coating composition is a pigmented basecoat or a clearcoat composition.

29. The process of claim 25 wherein said coating composition is a pigmented basecoat or a clearcoat composition.

30. A coated substrate produced in accordance with the process of claim 23 or 24.

31. A coating composition comprising:
(a) a binder component, which comprises:
(I) aldimine, ketimine, polyaspartic ester, or a combination thereof; and
(II) a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing a chain extender selected from the group consisting of a hydroxy carboxylic acid, a lactone of a hydroxy carboxylic acid and a combination thereof; and one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and wherein the weight ratio of the hyper branching monomer to the chain extender in said monomer mixture ranges from 1/0.3 to 1/20; and
(b) a crosslinking component selected from the group consisting of a polyisocyanate having at least two reactive isocyanate groups, a melamine and a combination thereof.

32. The coating composition of claim 31 wherein said monomer mixture further comprises a molecular weight controlling agent having in the range of 1 to 6 functionalities selected from the group consisting of hydroxyl, amine, epoxide, carboxyl and a combination thereof.

33. A coating composition comprising:
(a) a binder component, which comprises a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture containing:
(I) a chain extender selected from the group consisting of a hydroxy carboxylic acid, a lactone of a hydroxy carboxylic acid and a combination thereof;
(II) one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and
(III) a molecular weight controlling agent having in the range of 1 to 6 functionalities selected from the group consisting of hydroxyl, amine, epoxide, carboxyl and a combination thereof,
wherein the weight ratio of the hyper branching monomer to the chain extender in said monomer mixture ranges from 1/0.3 to 1/20, and wherein; and
(b) a crosslinking component selected from the group consisting of a polyisocyanate having at least two reactive isocyanate groups, a melamine and a combination thereof.

34. A coating composition comprising:
(a) a binder component, which comprises a highly branched copolyester polyol having a number average molecular weight ranging from 1000 to 30,000, hydroxyl groups ranging from 5 to 200 per polymer chain and carboxyl groups ranging from 0 to 40 per polymer chain, said copolyester polyol being polymerized from a monomer mixture comprising:
(I) a chain extender selected from the group consisting of dimethylol propionic acid, a caprolactone and a combination thereof;
(II) one or more hyper branching monomers, said hyper branching monomer having one carboxyl group and two hydroxyl groups, two carboxyl groups and one hydroxyl group, one carboxyl group and three hydroxyl groups, or three carboxyl groups and one hydroxyl group, and
(III) pentaerythritol, wherein the weight ratio of the hyper branching monomer to the chain extender in said monomer mixture ranges from 1/0.3 to 1/20, and wherein; and
(b) a crosslinking component selected from the group consisting of a polyisocyanate having at least two reactive isocyanate groups, a melamine and a combination thereof.

35. A coating composition comprising:
(a) a binder component, which comprises a highly branched copolyester polyol polymerized from a monomer mixture comprising: one or more hyper branching monomers having the structural formula:

$(R^2O)_n\text{---}R^4\text{---}[C(CO)O\ R^3]_m$; and a chain extender selected from the group consisting of a hydroxy carboxylic acid, an ester of a hydroxy carboxylic acid and a combination thereof, said hydroxy carboxylic acid having the structural formula:

$R^5O\text{---}R^6\text{---}C(O)O\ R^7$, wherein:
$R^2$ and $R^5$ are H or $(O)C\ R^8$,
$R^3$ and $R^7$ are H, $C_{1-12}$ hydrocarbyl radical or hydroxyl substituted $C_{1-12}$ hydrocarbyl radical,
$R^4$ is $C_{1-12}$ hydrocarbyl radical having m+n free valencies,
$R^6$ is $C_{1-12}$ hydrocarbyl radical with two free valencies,
$R^8$ is H or $C_{1-200}$ hydrocarbyl radical and
n+m ranges from 3 to 6, and provided n or m is 1; and
(b) a crosslinking component selected from the group consisting of a polyisocyanate having at least two reactive isocyanate groups, a melamine and a combination thereof, wherein ratio of said isocyanate groups on said polyisocyanate in said crosslinking component to said hydroxyl groups on said highly branched copolyester polyol ranges from 0.25/1 to 3/1 and amount of said melamine in said crosslinking component ranges from 10 weight percent to 40 weight percent, based on the total of said binder and crosslinking components.

36. The coating composition of claim 35 wherein said monomer mixture further comprises a molecular weight controlling agent having the formula:

$R^1\text{---}Z_k$, wherein:
$R^1$ is $C_{1-200}$ hydrocarbyl radical with free valencies ranging from 1 to 6,
Z is a hydroxyl, carboxyl, amine or epoxy group, and
k ranges from 1 to 6.

* * * * *